United States Patent
Wobrock

(10) Patent No.: US 10,574,873 B2
(45) Date of Patent: *Feb. 25, 2020

(54) SPEAKER-DEPENDENT VOICE-ACTIVATED CAMERA SYSTEM

(71) Applicant: Jesse L. Wobrock, Arroyo Grande, CA (US)

(72) Inventor: Jesse L. Wobrock, Arroyo Grande, CA (US)

(*) Notice: Subject to any disclaimer, the term of this patent is extended or adjusted under 35 U.S.C. 154(b) by 30 days.

This patent is subject to a terminal disclaimer.

(21) Appl. No.: 15/824,363

(22) Filed: Nov. 28, 2017

(65) Prior Publication Data

US 2018/0084171 A1    Mar. 22, 2018

Related U.S. Application Data

(63) Continuation of application No. 14/691,492, filed on Apr. 20, 2015, now Pat. No. 9,866,741.

(51) Int. Cl.
| | | |
|---|---|---|
| *G10L 15/22* | (2006.01) | |
| *H04N 5/232* | (2006.01) | |
| *G10L 17/00* | (2013.01) | |

(52) U.S. Cl.
CPC ............ *H04N 5/232* (2013.01); *G10L 17/00* (2013.01); *G10L 2015/223* (2013.01)

(58) Field of Classification Search
USPC .................... 704/246, 247, 251, 252, 275
See application file for complete search history.

(56) References Cited

U.S. PATENT DOCUMENTS

| | | | |
|---|---|---|---|
| 5,027,149 | A | 6/1991 | Hoshino |
| 5,715,487 | A | 2/1998 | McIntyre |
| 5,959,667 | A | 9/1999 | Maeng |
| 7,525,575 | B2 | 4/2009 | Rees |
| 9,179,105 | B1 | 11/2015 | Zeira |
| 2002/0052746 | A1 | 5/2002 | Handelman |
| 2004/0185900 | A1 | 9/2004 | McElveen |
| 2005/0118990 | A1 | 6/2005 | Stephens |
| 2010/0166399 | A1 | 7/2010 | Konicek |
| 2013/0124207 | A1 | 5/2013 | Sarin |
| 2013/0288744 | A1 | 10/2013 | Vock |
| 2014/0247368 | A1 | 9/2014 | Chinn |
| 2014/0347504 | A1 | 11/2014 | Konicek |

FOREIGN PATENT DOCUMENTS

| | | |
|---|---|---|
| CN | 201869265 | 6/2011 |
| WO | 201483052 | 6/2014 |

OTHER PUBLICATIONS

USPTO; Advisory Action from U.S. Appl. No. 14/691,492 dated Dec. 30, 2016.

(Continued)

*Primary Examiner* — Leonard Saint Cyr
(74) *Attorney, Agent, or Firm* — Fitch, Even, Tabin & Flannery LLP

(57) ABSTRACT

A voice-activated camera system for a computing device. The voice-activated camera system includes a processor, a camera module, a speech recognition module and a microphone for accepting user voice input. The voice-activated camera system includes authorized for only a specific user's voice, so that a camera function may be performed when the authorized user speaks the keyword, but the camera function is not performed when an unauthorized user speaks the keyword.

14 Claims, 4 Drawing Sheets

(56) References Cited

OTHER PUBLICATIONS

USPTO; Final Office Action from U.S. Appl. No. 14/691,492 dated Aug. 22, 2017.
USPTO; Final Office Action from U.S. Appl. No. 14/691,492 dated Oct. 12, 2016.
USPTO; Non-Final Office Action from U.S. Appl. No. 14/691,492 dated Apr. 29, 2016.
USPTO; Non-Final Office Action from U.S. Appl. No. 14/691,492 dated Mar. 7, 2017.
USPTO; Notice of Allowance from U.S. Appl. No. 14/691,492 dated Sep. 26, 2017.
Wobrock; U.S. Appl. No. 14/691,492 dated Apr. 20, 2015.

SPEAKER-DEPENDENT VOICE-ACTIVATED CAMERA SYSTEM

This application is a continuation of U.S. application Ser. No. 14/691,492, filed Apr. 20, 2015 for SPEAKER-DEPENDENT VOICE-ACTIVATED CAMERA SYSTEM, which is incorporated in its entirety herein by reference.

BACKGROUND OF THE INVENTION

1. Field of the Invention

The present invention relates generally to cameras, and more specifically to voice-activated cameras.

2. Discussion of the Related Art

Computing devices, particularly smartphones, typically include at least one camera. The camera may be controlled through various means, including, for example, a manual shutter button or a user interface of an application or firmware.

The user interface may include various elements for utilizing the camera, such as menu selection and keyboard input. Some computing device cameras may be configured to be operable using voice commands. A voice recognition system, either located on the computing system or a remote system, is typically used for recognizing the words of the speaker and converting them to computer-readable commands. Voice recognition systems used with computing systems are generally speaker-independent, i.e., the voice recognition system recognizes only words and not the identity of the individual speaker.

SUMMARY OF THE INVENTION

Several embodiments of the invention advantageously address the needs above as well as other needs by providing a voice-activated camera system, comprising: a computing device including: a processor; a camera module coupled to the processor, the camera module configured to execute at least one camera function; a speech recognition module coupled to the processor and the camera module, the speech recognition module configured to identify a user voice input as being from an authorized user; and a microphone coupled to at least one of the camera module and the speech recognition module, whereby the voice-activated camera system is configured to perform the steps of receive the user voice input via the microphone, identify whether the user voice input is from the authorized user; and upon identifying that the user voice input is from the authorized user, execute at least one camera function associated with the user voice input.

In another embodiment, the invention can be characterized as a method for using a voice-activated camera system of a computing device, comprising the steps of: receiving of a user voice input via a microphone coupled to the camera module; sending of the user voice input to a speech recognition module of the voice-activated computer system; determining whether the user voice input matches an authorized user voice; returning to a camera module of the voice-activated camera system, upon determining that the user voice input matches the authorized user voice, a matched indication; returning to the camera module, upon determining that the user voice input corresponds to one of at least one a keyword associated with a camera function, the keyword; performing by the camera module, upon receiving the matched indication and the keyword, the camera function associated with the key word.

In a further embodiment, the invention may be characterized as a method for associating a camera function with a voice command, comprising the steps of: requesting, by a camera module of a voice-activated camera system, of user voice input for a voice-activated camera function; capturing, by a microphone of the voice-activated camera system of the user voice input; analyzing, by a speech recognition module of the voice-activated camera system, of the user voice input; storing, by the speech recognition module, of voice parameters identifying a user associated with the user voice input; returning to the camera module, by the speech recognition module, an indication that the user voice input is associated with the camera function.

In yet another embodiment, the invention may be characterized as a method for using a voice-activated camera system, comprising the steps of: associating by the voice-activated camera system of a user voice input associated with a camera function and with an authorized user, the voice-activated camera system including at least a processor, a camera module configured to perform at least one camera function, a speech recognition module, and a microphone; receiving by the microphone of the user voice input; determining whether the user voice input is associated with the authorized user; determining whether the user voice input is associated with the camera function; performing, upon determining that the user voice input is associated with the camera function and with the authorized user, the camera function.

BRIEF DESCRIPTION OF THE DRAWINGS

The above and other aspects, features and advantages of several embodiments of the present invention will be more apparent from the following more particular description thereof, presented in conjunction with the following drawings.

Figure 1:
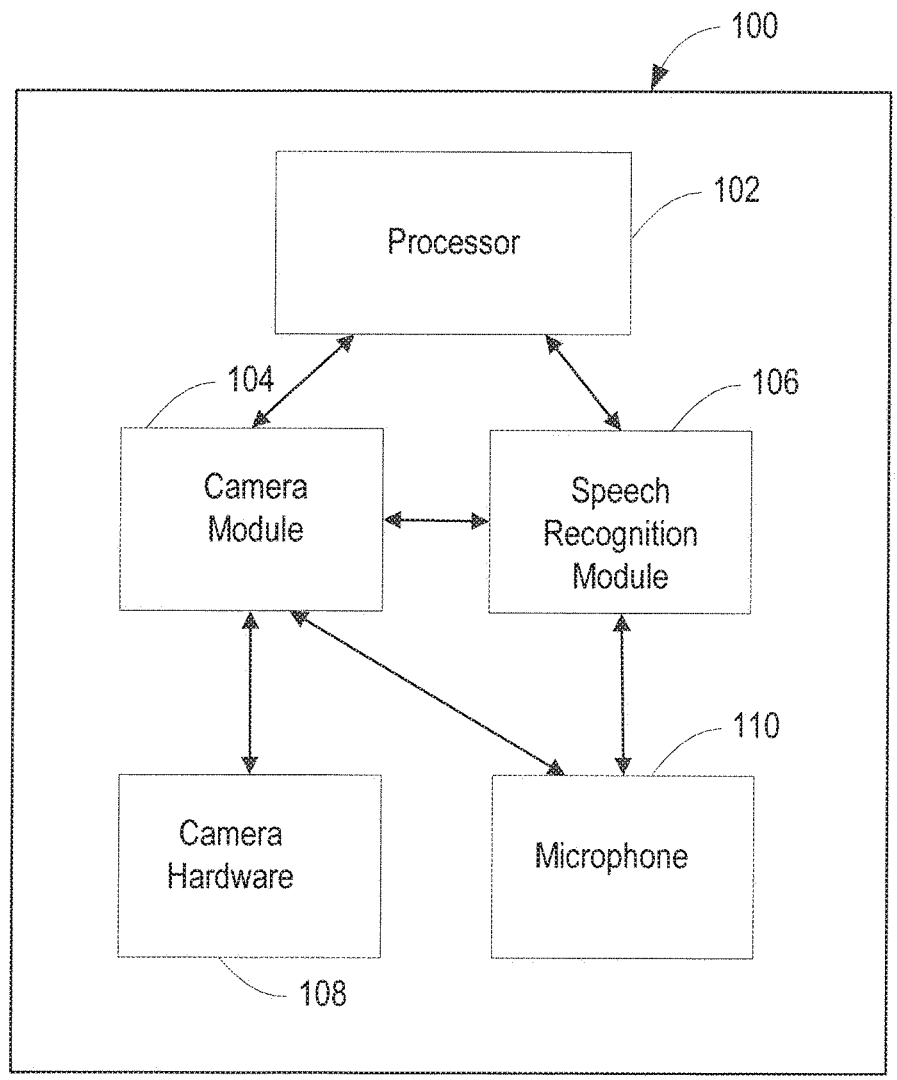
FIG. 1 is a schematic diagram of a voice-activated camera system in one embodiment of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Referring first to FIG. 1, a schematic diagram of a computing device 100 including components for operating a voice-activated camera system, is shown in one embodiment of the present invention. Shown are a processor 102, a camera module 104, a speech recognition module 106, camera hardware 108, and microphone 110.

As is known in the prior art, the computing device 100 generally includes the processor 102 configured to execute software modules. The system shown in FIG. 1 includes the camera module 104, and the speech recognition module 106, each coupled to the processor 102. It will be apparent to those of ordinary skill in the art that many other software and hardware elements may be included in the computing device 100 in addition to those shown in FIG. 1. The system also includes memory coupled to the processor 102, modules 104, 106, and other elements as required for the operation of the device 100 (not shown).

In some embodiments the computing device is a camera, a smartphone, a tablet, a portable media player including a camera, a smartwatch including a camera, a video camera, a police body camera, a sport camera, or an underwater camera.

In the system embodiment shown in FIG. 1, the camera module 104 is configured to interface with the processor 102, speech recognition module 106, camera hardware 108, and the microphone 110 as required to carry out the processes as described herein further below. The camera module 104 may also interact with other modules and hardware not shown, for example a keyboard input module to receive keyboard input from a user. In some embodiments, speech recognition module components may be incorporated into the camera module 104.

The speech recognition module 106 in one embodiment is operatively coupled to the microphone 110 and receives the user voice input to analyze and store as an authorized voice, or to analyze against previously stored voices. In other embodiments the camera module 104 may be coupled to the microphone 110 and may receive the user voice input from the microphone 110 and transfer it to the speech recognition module 106. In yet other embodiments, the camera module 104 components may be incorporated into the speech recognition module 106. It will be appreciated that other module configurations may also comprise the voice-activated camera system, provided the system is configured to perform the required actions.

The speech recognition module 106 includes components as required to record, store and analyze voices to a) identify the speech characteristics of at least one authorized voice (i.e. perform enrollment for speaker recognition of the authorized user) and b) compare a user voice input to the at least one authorized voice and determine whether the user voice input matches the authorized voice, i.e., use speaker-dependent voice recognition to identify the user voice input as being from the authorized user. The speech recognition module 106 is also configured to output an indication of matching of the user voice input to the authorized voice and an indication of recognizing at least one keyword associated with one camera function. In some embodiments, the authorization of a user voice may take place using a camera module user interface of the camera module 104. In other embodiments, the authorization of the user voice may take place using a speech recognition user interface of the speech recognition module 106.

The camera module 104 is configured to receive the authorized user indication and the keyword indication from the speech recognition module 106. When the camera module 104 receives the authorized user indication and the keyword indication, the camera module 104 is configured to execute the camera function associated with the keyword. If the camera receives only the keyword indication, the camera function is not performed even if the user voice input includes the correct keyword matching the camera function.

The camera hardware 108, for example, a shutter and a flash, are operatively coupled to the camera module 104 for control through the camera module 104 via voice recognition or other means of user input.

In some embodiments, the voice-activated camera system is accessed via an application, which may include a user interface specific to the application. The application may then access the camera module 104 and speech recognition module 106 as required. In some embodiments, the voice-activated camera system runs as a background process, continuously monitoring voice input.

Figure 2:
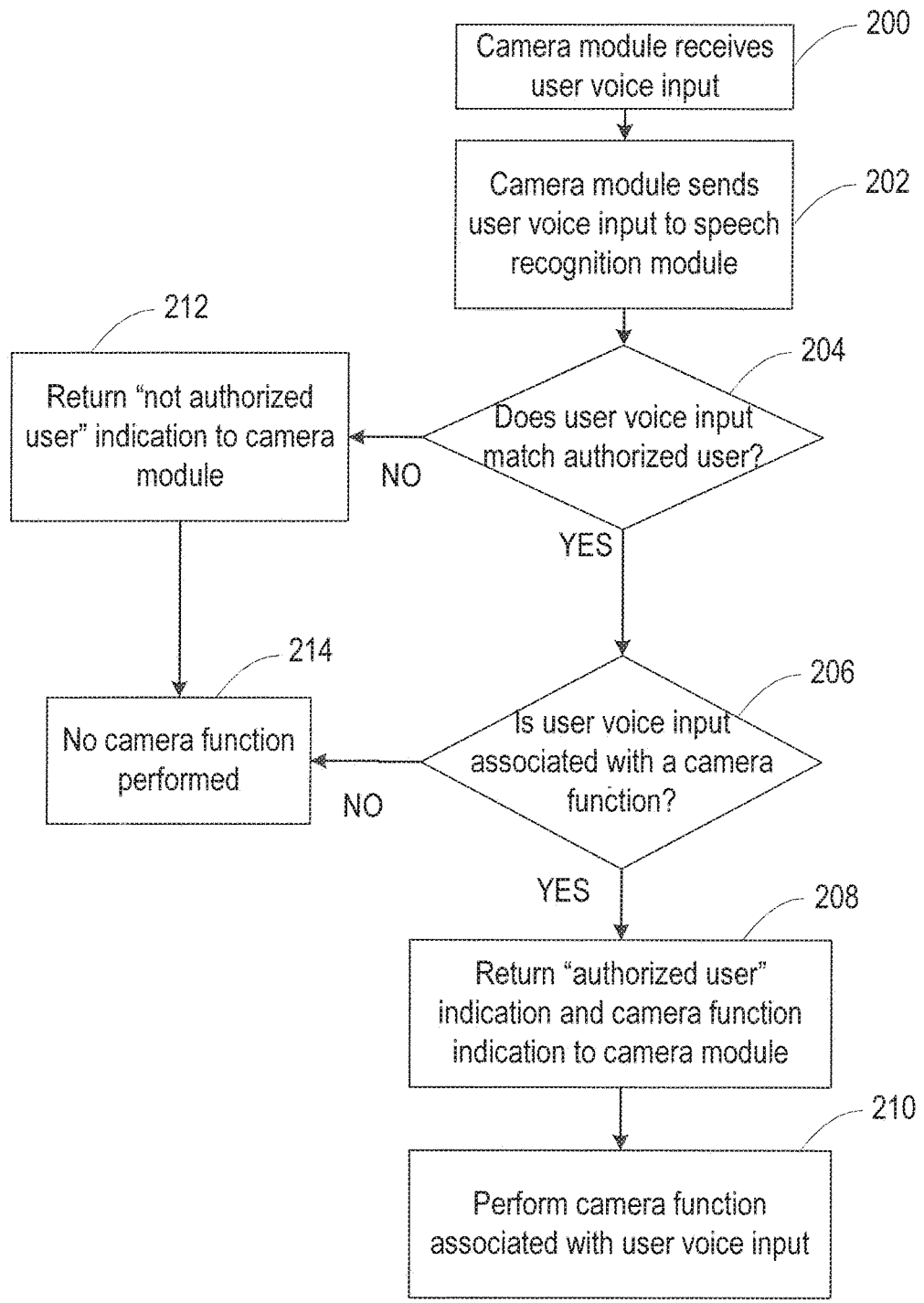
FIG. 2 is a flowchart diagram of a process for using the voice-activated camera system in accordance with one embodiment of the present invention.

Referring next to FIG. 2, a process for using the voice-activated camera system to execute the camera function by the authorized user is shown in one embodiment of the present invention. Shown are a receive user voice input step 200, a send user voice input step 202, a match authorized user decision point 204, a camera function decision point step 206, a return authorized user indication step 208, a perform camera function step 210, a not authorized user step 212, and a function not performed step 214.

In the first step, the receive user voice input step 200, the camera module 104 receives the user voice input associated with a camera function via the microphone 110 coupled to the camera module 104. The process then proceeds to the send user voice input step 202.

In the send user voice input step 202, the camera module 104 sends the user voice input to the speech recognition module 106 for analysis. The process then proceeds to the match authorized user decision point 204. In the match authorized user decision point 204, the speech recognition module 106 analyzes the user voice input and compares the user voice input to previously stored voice characteristics for the authorized user (or authorized users, if the system is configured to allow multiple authorized users). The voice characteristics of the authorized user have previously been input to the speech recognition module 106, as outlined further below in FIG. 3, such that the speech recognition module is configured to positively identify the authorized user based on speaker recognition. If the user voice input does not match the authorized user (or any of the authorized users for a plurality of authorized users), i.e. the speech recognition module identifies the user (speaker) voice and determines that the user is not authorized, the process proceeds to the not authorized user step 212. If the user voice input matches an authorized user, the process proceeds to the camera function decision point step 206.

In the not authorized user step 212, the speech recognition module 106 returns to the camera module 104 an indication that the user voice input does not correspond to the authorized user, i.e. the characteristics of the user voice do not match the characteristics of the authorized user. The process then proceeds to the function not performed step 214. In the function not performed step 214, the camera module 104, in response to receiving the indication that the user is not authorized, does not execute any camera functions. It will be appreciated that the camera module 104 may perform any one of various actions in response to the indication that the user in not authorized, such as returning the display to a general menu, or indicating on the display that the user is not authorized.

In the camera function decision point step 206 the camera module 104, in response to the indication that the user voice input corresponds to the authorized user, compares the user voice input to keywords associated with stored camera functions. If the user voice input consists of or includes the keyword that matches the associated camera function, the process proceeds to the return authorized user indication step 208. If the user voice input does not match one of the keywords, the process then proceeds to the function not performed step 214, and the camera does not execute any camera functions, as previously stated. In the case of the authorized user, but the keyword not being recognized, the camera module 104 may be configured to request another user voice input or display that the voice input was not recognized.

During the return authorized user indication step 2018, the speech recognition module 106 returns to the camera module 104 the indication that the user voice input matches the authorized user. The speech recognition module 106 also returns the indication of the camera function associated with the keyword recognized previously in the camera function decision point step 206. The process then proceeds to the camera function decision point step 206.

In the perform camera function step 210, the camera executes the camera function associated with the keyword.

Referring again to FIG. 2, the process for using the camera functions by only the authorized user prevents unauthorized users from using one or more camera functions. In one example, the camera module 104 is configured to perform the function of taking a photo in response to receiving the authorized user voice input of the keyword "cheese". If a first user has been previously authorized by the speech recognition, when the first user speaks the word "cheese," the speech recognition module 106 recognizes that the first user is authorized, and returns to the camera module 104 the authorization indication. The speech recognition module 106 also recognizes the keyword "cheese", determines that the keyword "cheese" is associated with the camera function of taking a photo and returns to the camera module 104 the indication that taking of a photo is the requested camera function. The camera module 104 then, in response to the indications, takes the photo.

In some embodiments, the camera module 104 may be configured to perform the camera function if at least one word is spoken by the authorized user. For example, if the camera function of taking a photo is associated with the word "cheese," the phrase "say cheese" would also result in taking of the photo.

As previously mentioned, in some embodiments the speech recognition module 106 may be configured to authorize more than one user.

In some embodiments, the word or words associated with camera functions are pre-set. In other embodiments, the camera module 104 may be configured to allow the user to change or add to a list of words associated with the camera function.

Figure 3:
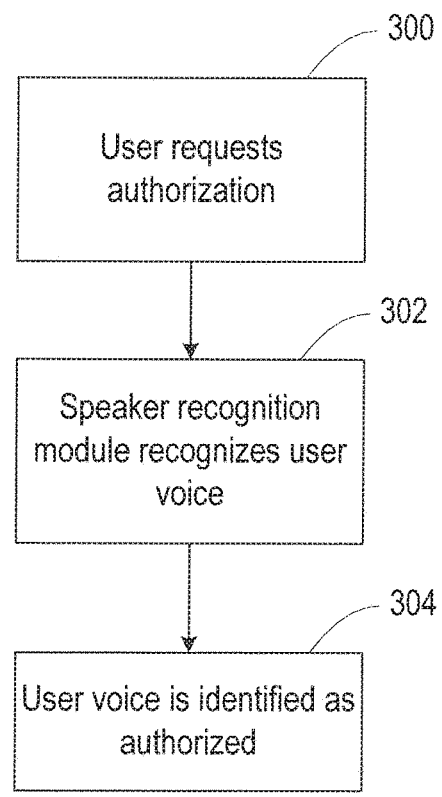
FIG. 3 is a flowchart diagram of a process for recognizing an authorized user of the voice-activated camera system in accordance with one embodiment of the present invention.

Referring next to FIG. 3, a process for recognition of an authorized speaker is shown in one embodiment of the present invention. Shown are a user requests authorization step 300, a recognize user step 302, and an identify authorized user step 304

In the initial user requests authorization step 300, the user requests authorization as the authorized speaker. In one embodiment, the request is input through the camera module user interface. The process then proceeds to the recognize user step 302.

In the recognize user step 302, the speech recognition module 106 receives the request for speaker recognition and performs the steps required for being able to recognize the voice of the user. The user speech recognition steps may vary depending on the type of speech recognition module 106, and may be done in any way generally known in the art. The process then proceeds to the identify authorized user step 304.

In the next identify authorized user step 304, the speech recognition module 106 stores a user speech indication that the recognized voice is associated with the authorized user.

Referring again to FIG. 3, one embodiment of associating the user voice with the authorized user is shown. Those of ordinary skill in the art will note that additional processes and methods of identifying the authorized user voice are available. For example, the speech recognition module 106 could be performed by a remote server and a compressed version of voice identification could be stored in the speech recognition module 106 in order to reduce local computing demand.

Figure 4:
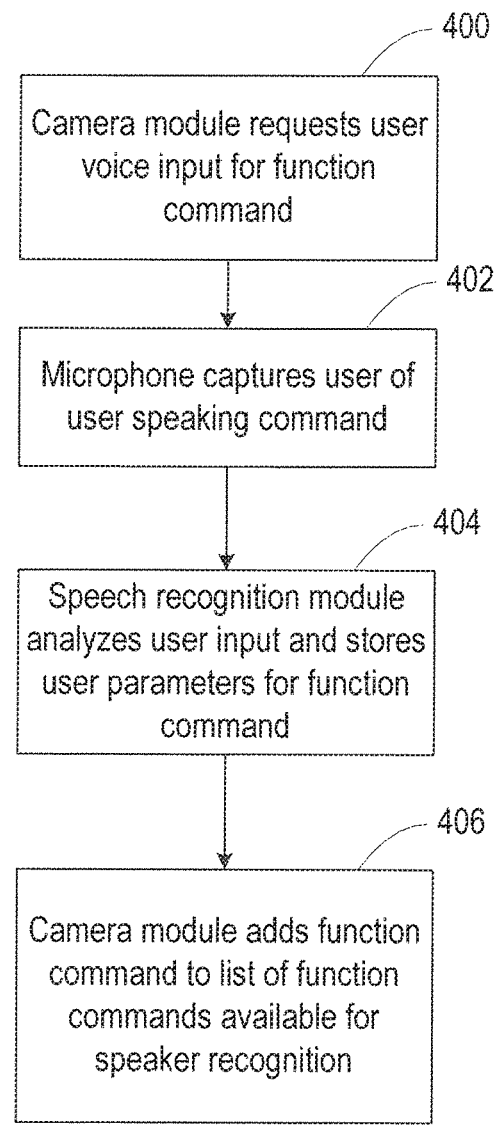
FIG. 4 is a flowchart diagram of a process for storing a camera function command for an authorized user is shown in accordance with another embodiment of the present invention.

Referring next to FIG. 4, a process for storing a camera function command for the authorized user is shown in another embodiment of the present invention. Shown are an initial request user input step 400, a capture voice command step 402, a store voice command data step 404, and an add function command step 406.

In the initial request user input step 400, the camera module 104 requests user voice input for associating a voice command, from the authorized user, with the camera function. In one example, the voice command requested may be the word "cheese," which would be associated with the camera function of taking a photo. The process then proceeds to the capture voice command step 402.

In the capture voice command step 402, the microphone 110 captures the authorized user speaking the voice command, "cheese," and sends the user voice input to the speech recognition module 106. In some embodiments, multiple voice inputs may be requested in order for the speech recognition module 106 to have enough data to recognize the user's identity. The process then proceeds to the store voice command data step 404.

During the store voice command data step 404, the speech recognition module 106 analyses the user voice input or inputs and stores the speech parameters necessary to identify the voice command spoken by the authorized user. The speech recognition module 106, or in some embodiments the camera module 104, also stores the association of the camera function with the voice command. In this example, the voice command "cheese" is associated with the camera function of taking a photo. The process then proceeds to the add function command step 406.

In the add function command step 406, the camera module 104 adds the voice command to a list of camera functions available for execution by voice recognition of the authorized user.

Referring again to FIG. 4, another embodiment of the voice-activated camera system uses recognition of specific voice commands in lieu of recognition of the authorized user's general voice. In the embodiment shown in FIG. 4, the user calibrates each camera function to the authorized user speaking the voice command associated with the camera function.

In one example, the authorized user wishes to add the voice command "cheese" to the camera function of taking a photo. The authorized user goes through the process outlined in FIG. 4, after which the voice-activated camera system is able to recognize specifically the authorized user speaking the voice command "cheese." In operation, when the authorized user speaks the voice command, the camera module 104 and the speech recognition module 106 verify the match between the authorized user speaking the voice command "cheese" and in response the camera module 104 executes the associated camera function of taking a photo.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

While the invention herein disclosed has been described by means of specific embodiments, examples and applications thereof, numerous modifications and variations could be made thereto by those skilled in the art without departing from the scope of the invention set forth in the claims.

What is claimed is:

1. A speaker-dependent voice-activated camera system, comprising:
a processor;
a camera module coupled to the processor, the camera module configured to execute a plurality of camera functions, wherein each of the plurality of camera functions is associated with a camera function keyword, and wherein the camera module is configured to execute each camera function in response to user input; and
a speech recognition module coupled to the processor and the camera module, the speech recognition module configured to analyze and store voice characteristics, receive voice input, and determine, using previously stored voice characteristics, whether received voice input is from an authorized user and whether the received voice input includes at least one camera function keyword,
wherein the speech recognition module is configured to perform the steps of:
receive a first voice input;
determine whether the first input is from the authorized user;
upon determining that the first voice input is not from the authorized user, returning to the camera module an unauthorized user indication;
upon determining that the first voice input is from the authorized user, returning to the camera module an authorized user indication and determining if the first voice input includes one camera function keyword;
upon determining that the first voice input does not match one camera function keyword, returning to the camera module an unmatched keyword indication; and
upon determining that the first voice input matches one camera function keyword, returning to the camera module an indication of the camera function associated with the matched camera function keyword, whereby the camera module executes the camera function associated with the matched camera function keyword.

2. The speaker-dependent voice-activated camera system of claim 1, the camera module further comprising a user interface.

3. The speaker-dependent voice-activated camera system of claim 2, wherein upon receiving the unauthorized user indication the camera module indicates to the user, via the user interface, that the first voice input does not match the authorized user.

4. The speaker-dependent voice-activated camera system of claim 3, wherein the indication to the user includes indicating on a display of the user interface that the first voice input did not match the authorized user.

5. The speaker-dependent voice-activated camera system of claim 3, wherein the indication to the user includes returning the user interface to a general menu.

6. The speaker-dependent voice-activated camera system of claim 2, wherein upon receiving the unmatched keyword indication the camera module indicates to the user, via the user interface, that the first voice input did not include one camera function keyword.

7. The speaker-dependent voice-activated camera system of claim 6, wherein the indication to the user includes requesting another voice input.

8. The speaker-dependent voice-activated camera system of claim 6, wherein the indication to the user includes displaying that the voice input was not recognized.

9. The speaker-dependent voice-activated camera system of claim 7, wherein the indication to the user includes displaying that the voice input was not recognized.

10. A method for operating a speaker-dependent voice-activated camera system, comprising the steps of:
receiving of a first voice input by a speech recognition module of the camera system, the speech recognition module configured to analyze and store voice characteristics, receive voice input, and determine, using previously stored voice characteristics, whether received voice input is from an authorized user and whether the received voice input includes at least one camera function keyword;
determining whether the first input is from the authorized user;
upon determining that the first voice input is not from the authorized user, returning to a camera module an unauthorized user indication, wherein the camera module is coupled to the speech recognition module, and wherein the camera module is configured to execute a plurality of camera functions, wherein each of the plurality of camera functions is associated with a camera function keyword, and wherein the camera module is configured to execute each camera function in response to user input;
upon determining that the first voice input is from the authorized user, returning to the camera module an authorized user indication and determining if the first voice input includes one camera function keyword;
upon determining that the first voice input does not match one camera function keyword, returning to the camera module an unmatched keyword indication; and
upon determining that the first voice input matches one camera function keyword, returning to the camera module an indication of the camera function associated with the matched camera function keyword, whereby the camera module executes the camera function associated with the matched camera function keyword.

11. The method for operating the speaker-dependent voice-activated camera system of claim 10, wherein the step of returning to the camera module the unauthorized user indication includes the camera module further comprising a user interface.

12. The method for operating the speaker-dependent voice-activated camera system of claim 11, wherein upon receiving the unauthorized user indication the camera module indicates to the user, via the user interface, that the first voice input does not match the authorized user.

13. The method for operating the speaker-dependent voice-activated camera system of claim 12, wherein the indication to the user includes indicating on a display of the user interface that the first voice input did not match the authorized user.

14. The method for operating the speaker-dependent voice-activated camera system of claim 4, wherein the indication to the user includes returning the user interface to a general menu.

* * * * *

UNITED STATES PATENT AND TRADEMARK OFFICE
CERTIFICATE OF CORRECTION

PATENT NO. : 10,574,873 B2
APPLICATION NO. : 15/824363
DATED : February 25, 2020
INVENTOR(S) : Jesse L. Wobrock Page 1 of 1

It is certified that error appears in the above-identified patent and that said Letters Patent is hereby corrected as shown below:

In the Claims
Claim 14, Column 10, Line 26, delete "claim 4" and insert --claim 12--.

Signed and Sealed this
Twenty-sixth Day of May, 2020

Andrei Iancu
*Director of the United States Patent and Trademark Office*